(12) United States Patent
Fu et al.

(10) Patent No.: US 9,888,245 B2
(45) Date of Patent: Feb. 6, 2018

(54) IMAGE COMPRESSION METHOD AND APPARATUS FOR PERFORMING AMPLITUDE DECREASING PROCESSING

(71) Applicant: Huawei Technologies Co., Ltd., Shenzhen, Guangdong (CN)

(72) Inventors: Jiali Fu, Shenzhen (CN); Jiantong Zhou, Shenzhen (CN); Sixin Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/165,517

(22) Filed: May 26, 2016

(65) Prior Publication Data
US 2016/0277746 A1 Sep. 22, 2016

Related U.S. Application Data

(63) Continuation of application No. PCT/CN2014/075196, filed on Apr. 11, 2014.

(30) Foreign Application Priority Data

Nov. 29, 2013 (CN) .......................... 2013 1 0631742

(51) Int. Cl.
*G06K 9/36* (2006.01)
*H04N 19/154* (2014.01)
(Continued)

(52) U.S. Cl.
CPC .......... *H04N 19/154* (2014.11); *H04N 19/124* (2014.11); *H04N 19/132* (2014.11);
(Continued)

(58) Field of Classification Search
CPC ........ H04N 7/30; H04N 7/50; H04N 7/26313; H04N 7/26106; H04N 19/124;
(Continued)

(56) References Cited

U.S. PATENT DOCUMENTS 6,285,798 B1 * 9/2001 Lee .......................... G06T 5/004
382/260
6,377,309 B1 * 4/2002 Ito .................. H04N 21/234318
348/554
(Continued)

FOREIGN PATENT DOCUMENTS

CN 1757237 A 4/2006
CN 101527800 A 9/2009
(Continued)

OTHER PUBLICATIONS

Jong Hwa Lee et al., "An Efficient Encoding of DCT Blocks with Block-Adaptive Scanning", IEICE Transactions on Communications, vol. E77-B, No. 12, Dec. 1, 1994, p. 1489-1494.
(Continued)

*Primary Examiner* — Amir Alavi

(57) ABSTRACT

The present invention relates to an image compression method and apparatus, where the image compression method includes a step of performing amplitude decreasing processing on a frequency domain coefficient or a quantization coefficient of a to-be-processed image. The image compression method includes: determining a texture direction of the to-be-processed image; and performing amplitude decreasing processing on the frequency domain coefficient or the quantization coefficient of the to-be-processed image according to the texture direction, where the frequency domain coefficient is a coefficient obtained after the image is transformed, and the quantization coefficient is a coefficient obtained after the frequency domain coefficient is quantized. According to embodiments of the present invention, amplitude decreasing processing is performed on a frequency domain coefficient of a to-be-processed image according to a texture direction of the to-be-processed image, which can improve the compression efficiency with-
(Continued)

out affecting subjective quality of the to-be-processed image.

17 Claims, 8 Drawing Sheets

(51) Int. Cl.
    *H04N 19/176*     (2014.01)
    *H04N 19/132*     (2014.01)
    *H04N 19/14*     (2014.01)
    *H04N 19/48*     (2014.01)
    *H04N 19/124*     (2014.01)
    *H04N 19/18*     (2014.01)
    *H04N 19/40*     (2014.01)

(52) U.S. Cl.
    CPC ........... *H04N 19/14* (2014.11); *H04N 19/176* (2014.11); *H04N 19/18* (2014.11); *H04N 19/48* (2014.11); *H04N 19/40* (2014.11)

(58) Field of Classification Search
    CPC .... H04N 19/154; H04N 19/18; H04N 19/176; H04N 19/132; H04N 19/14; H04N 19/48; H04N 19/40
    See application file for complete search history.

(56) References Cited

U.S. PATENT DOCUMENTS

| | | | | |
|---|---|---|---|---|
| 6,763,071 | B1* | 7/2004 | Maeda | H04N 5/913 348/465 |
| 7,133,447 | B2* | 11/2006 | Byun | H04N 5/145 348/E5.066 |
| 8,452,110 | B2 | 5/2013 | Carmel et al. | |
| 9,641,849 | B2* | 5/2017 | Jeong | H04N 19/159 |
| 2001/0024530 | A1* | 9/2001 | Fukuhara | H04N 19/176 382/240 |
| 2006/0165163 | A1 | 7/2006 | Burazerovic et al. | |
| 2012/0300233 | A1* | 11/2012 | Iwamoto | H04N 1/60 358/1.9 |
| 2016/0277746 | A1* | 9/2016 | Fu | H04N 19/176 |

FOREIGN PATENT DOCUMENTS

| | | |
|---|---|---|
| CN | 101996411 A | 3/2011 |
| CN | 102202217 A | 9/2011 |
| CN | 102316324 A | 1/2012 |
| CN | 102611831 A | 7/2012 |
| CN | 103024377 A | 4/2013 |
| CN | 103366366 A | 10/2013 |
| EP | 1079636 A1 | 2/2001 |
| EP | 1439706 A2 | 7/2004 |
| WO | 2013/008459 A1 | 1/2013 |

OTHER PUBLICATIONS

Yifu Zhang et al., "A Fast Adaptive Quantization Matrix Selection Method in H.264/AVC", IEEE, May 18, 2008, p. 624-627.

Yuji Itoh, "An Adaptive DCT Coding with Geometrical Edge Representation", IEICE Trans. Inf. & Syst., vol. E86 D, No. 6, Jun. 1, 2003, p. 1087-1094, XP-001184617.

Heidi A. Peterson et al., "An Improved Detection Model for DCT Coefficient Quantization", SPIE vol. 1913, p. 191-201.

Matthew Crouse et al., "Joint Thresholding and Quantizer Selection for Decoder-Compatible Baseline JPEG", 1995 IEEE, p. 2331-2334.

"Series H: Audiovisual and Multimedia Systems Infrastructure of audiovisual services—Coding of moving video; High efficiency video coding", ITU-T Recommendation ITU-T H.265, Apr. 2013, 317 pages.

International Telecommunication Union, ITU-T H.264 (Apr. 2013), Recommendation ITU-T H.264,Series H: Audiovisual and Multimedia Systems, Infrastructure of audiovisual services—Coding of moving video, Advanced video coding for generic audiovisual services, Apr. 2013, 732 pages.

\* cited by examiner

IMAGE COMPRESSION METHOD AND APPARATUS FOR PERFORMING AMPLITUDE DECREASING PROCESSING

CROSS-REFERENCE TO RELATED APPLICATIONS

This application is a continuation of International Application No. PCT/CN2014/075196, filed on Apr. 11, 2014, which claims priority to Chinese Patent Application No. 201310631742.X, filed on Nov. 29, 2013, both of which are hereby incorporated by reference in their entireties.

TECHNICAL FIELD

The present invention relates to the field of image processing, and in particular, to an image compression method and apparatus.

BACKGROUND

With development of the mobile Internet and smartphones, image compression has made a new progress. A major drive of researches of the industry for static image compression efficiency is application of mobile media sharing. Because smartphones have become an integration of media collection and application, a camera of a smartphone may capture an image with resolution of over 8 megapixels. Images have become a major media form in a rich media format of the mobile Internet, and a webpage browsed by using a mobile phone includes a large quantity of images; the popularity of socialized media applications such as Weibo and WeChat also makes rapid image sharing become necessary.

Generally, the Joint Photographic Experts Group (JPEG) compression standard has 10 times compression efficiency in a case in which subjective quality stays equivalent before and after compression, and this compression efficiency cannot meet requirements of compression, uploading, and sharing of an existing high-resolution image. Currently, in some applications, for example, Sina Weibo, downsampling is first performed on resolution of an image, and then a method of the JPEG compression standard is used to perform coding and compression, which may reduce resolution of a high-resolution image by approximately 1/16, but greatly affects subjective quality of the image.

SUMMARY

One technical problem to be resolved in the present invention is how to improve compression efficiency of an image without reducing subjective quality of the image.

To resolve the foregoing technical problem, according to a first aspect, an embodiment of the present invention provides an image compression method, including a step of performing amplitude decreasing processing on a frequency domain coefficient or a quantization coefficient of a to-be-processed image, where the image compression method includes:

determining a texture direction of the to-be-processed image; and performing amplitude decreasing processing on the frequency domain coefficient or the quantization coefficient of the to-be-processed image according to the texture direction, where the frequency domain coefficient is a coefficient obtained after the image is transformed, and the quantization coefficient is a coefficient obtained after the frequency domain coefficient is quantized.

With reference to the first aspect, in a first possible implementation manner, the performing amplitude decreasing processing on the frequency domain coefficient or the quantization coefficient of the to-be-processed image according to the texture direction includes:

acquiring an energy focused region and a non-energy focused region of the frequency domain coefficient or the quantization coefficient according to the texture direction, where a sum of frequency domain coefficient amplitudes or a sum of quantization coefficient amplitudes in the energy focused region is greater than that in the non-energy focused region; and performing amplitude decreasing processing on one or more frequency domain coefficients or quantization coefficients in the non-energy focused region.

With reference to the first aspect or the first possible implementation manner of the first aspect, in a second possible implementation manner, before the determining a texture direction of the to-be-processed image, the method further includes:

determining, according to a frequency domain coefficient of each transform block of the to-be-processed image, whether image content corresponding to the transform block is flat image content, where the transform block is a block that is obtained by dividing the to-be-processed image in advance and on which frequency domain transform is performed; and performing amplitude decreasing processing on a frequency domain coefficient or a quantization coefficient of a transform block belonging to the flat image content.

With reference to the second possible implementation manner of the first aspect, in a third possible implementation manner, the determining a texture direction of the to-be-processed image includes: determining a texture direction of a transform block belonging to texture image content, where the transform block belonging to the texture image content is a transform block that is in the to-be-processed image and does not belong to the flat image content; and the performing amplitude decreasing processing on the frequency domain coefficient or the quantization coefficient of the to-be-processed image according to the texture direction includes: performing, according to the texture direction, amplitude decreasing processing on a frequency domain coefficient or a quantization coefficient corresponding to the transform block belonging to the texture image content.

With reference to the first aspect, the first possible implementation manner of the first aspect, the second possible implementation manner of the first aspect, or the third possible implementation manner of the first aspect, in a fourth possible implementation manner, before the determining a texture direction of the to-be-processed image, the method further includes:

decoding the to-be-processed image, to obtain decoding information of the to-be-processed image, where the decoding information includes at least one of the frequency domain coefficient, a quantization matrix, image resolution, and an image size of the to-be-processed image;

determining a compression strength of the to-be-processed image according to the frequency domain coefficient of the to-be-processed image, or according to a quantization factor in the quantization matrix, or according to the image resolution and the image size; and determining, according to the compression strength, whether compression processing needs to be performed on the to-be-processed image, and in a case in which compression processing needs to be performed, determining a strength of the compression processing.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, the frequency domain coefficient includes a direct current DC coefficient and an alternating current AC coefficient, and the determining a texture direction of the to-be-processed image includes:

determining, according to a frequency domain AC coefficient of a transform block in the image, a texture direction of a to-be-processed image corresponding to the transform block.

With reference to the second possible implementation manner of the first aspect, or the third possible implementation manner of the first aspect, in a sixth possible implementation manner, the frequency domain coefficient includes a direct current DC coefficient and an alternating current AC coefficient, and the determining, according to a frequency domain coefficient of each transform block of the to-be-processed image, whether image content corresponding to the transform block is flat image content includes:

determining whether a quadratic sum of all AC coefficients of the transform block is less than a product of a quadratic sum of DC coefficients of the transform block and a constant, where if yes, the image content corresponding to the transform block is flat image content; otherwise, the image content corresponding to the transform block is texture image content.

To resolve the foregoing technical problem, according to a second aspect, another embodiment of the present invention provides an image compression method, including a step of performing amplitude decreasing processing on a frequency domain coefficient or a quantization coefficient of a to-be-processed image, where the image compression method includes:

determining, according to a frequency domain coefficient of each transform block of the to-be-processed image, whether image content corresponding to the transform block is flat image content, wherein the transform block is a block that is obtained by dividing the to-be-processed image in advance and on which frequency domain transform is performed; and performing amplitude decreasing processing on a frequency domain coefficient or a quantization coefficient of a transform block belonging to the flat image content.

With reference to the second aspect, in a first possible implementation manner, before the determining, according to a frequency domain coefficient of each transform block of the to-be-processed image, whether image content corresponding to the transform block is flat image content, the method further includes:

decoding the to-be-processed image, to obtain decoding information of the to-be-processed image, where the decoding information includes at least one of the frequency domain coefficient, a quantization matrix, image resolution, and an image size of the to-be-processed image;

determining a compression strength of the to-be-processed image according to the frequency domain coefficient of the to-be-processed image, or according to a quantization factor in the quantization matrix, or according to the image resolution and the image size; and determining, according to the compression strength, whether compression processing needs to be performed on the to-be-processed image, and in a case in which compression processing needs to be performed, determining a strength of the compression processing.

With reference to the second aspect or the first possible implementation manner of the second aspect, in a second possible implementation manner, the frequency domain coefficient includes a direct current DC coefficient and an alternating current AC coefficient, and the determining, according to a frequency domain coefficient of each transform block of the to-be-processed image, whether image content corresponding to the transform block is flat image content includes:

determining whether a quadratic sum of all AC coefficients of the transform block is less than a product of a quadratic sum of DC coefficients of the transform block and a constant, where if yes, the image content corresponding to the transform block is flat image content; otherwise, the image content corresponding to the transform block is texture image content.

To resolve the foregoing technical problem, according to a third aspect, another embodiment of the present invention provides an image compression apparatus, including:

a texture determining unit, configured to determine a texture direction of a to-be-processed image; and an amplitude decreasing processing unit, configured to perform amplitude decreasing processing on a frequency domain coefficient or a quantization coefficient of the to-be-processed image according to the texture direction, where the frequency domain coefficient is a coefficient obtained after the image is transformed, and the quantization coefficient is a coefficient obtained after the frequency domain coefficient is quantized.

With reference to the third aspect, in a first possible implementation manner, the amplitude decreasing processing unit is specifically configured to acquire an energy focused region and a non-energy focused region of the frequency domain coefficient or the quantization coefficient according to the texture direction, where a sum of frequency domain coefficient amplitudes or a sum of quantization coefficient amplitudes in the energy focused region is greater than that in the non-energy focused region; and perform amplitude decreasing processing on one or more frequency domain coefficients or quantization coefficients in the non-energy focused region.

With reference to the third aspect or the first possible implementation manner of the third aspect, in a second possible implementation manner, the image compression apparatus further includes:

a flatness determining unit, configured to determine, according to a frequency domain coefficient of each transform block of the to-be-processed image, whether image content corresponding to the transform block is flat image content, where the transform block is a block that is obtained by dividing the to-be-processed image in advance and on which frequency domain transform is performed, where the amplitude decreasing processing unit is further configured to perform amplitude decreasing processing on a frequency domain coefficient or a quantization coefficient of a transform block belonging to the flat image content.

With reference to the second possible implementation manner of the third aspect, in a third possible implementation manner, the texture determining unit is further configured to determine a texture direction of a transform block belonging to texture image content, where the transform block belonging to the texture image content is a transform block that is in the to-be-processed image and does not belong to the flat image content; and the amplitude decreasing processing unit is further configured to perform, according to the texture direction, amplitude decreasing processing on a frequency domain coefficient or a quantization coefficient corresponding to the transform block belonging to the texture image content.

With reference to the third aspect, the first possible implementation manner of the third aspect, the second possible implementation manner of the third aspect, or the third possible implementation manner of the third aspect, in a fourth possible implementation manner, the image compression apparatus further includes:

a decoding unit, configured to decode the to-be-processed image, to obtain decoding information of the to-be-processed image, where the decoding information includes at least one of the frequency domain coefficient, a quantization matrix, image resolution, and an image size of the to-be-processed image; and a statistical analysis unit, configured to determine a compression strength of the to-be-processed image according to the frequency domain coefficient of the to-be-processed image, or according to a quantization factor in the quantization matrix, or according to the image resolution and the image size; and determine, according to the compression strength, whether compression processing needs to be performed on the to-be-processed image, and in a case in which compression processing needs to be performed, determine a strength of the compression processing.

With reference to the third aspect, the first possible implementation manner of the third aspect, the second possible implementation manner of the third aspect, the third possible implementation manner of the third aspect, or the fourth possible implementation manner of the third aspect, in a fifth possible implementation manner, the frequency domain coefficient includes a direct current DC coefficient and an alternating current AC coefficient, and the texture determining unit is specifically configured to determine, according to a frequency domain AC coefficient of a transform block in the image, a texture direction of a to-be-processed image corresponding to the transform block.

With reference to the second possible implementation manner of the third aspect, or the third possible implementation manner of the third aspect, in a sixth possible implementation manner, the frequency domain coefficient includes a direct current DC coefficient and an alternating current AC coefficient, and the flatness determining unit is specifically configured to:

determine whether a quadratic sum of all AC coefficients of the transform block is less than a product of a quadratic sum of DC coefficients of the transform block and a constant, where if yes, the image content corresponding to the transform block is flat image content; otherwise, the image content corresponding to the transform block is texture image content.

To resolve the foregoing technical problem, according to a fourth aspect, another embodiment of the present invention provides an image compression apparatus, including:

a flatness determining unit, configured to determine, according to a frequency domain coefficient of each transform block of a to-be-processed image, whether image content corresponding to the transform block is flat image content, where the transform block is a block that is obtained by dividing the to-be-processed image in advance and on which frequency domain transform is performed; and an amplitude decreasing processing unit, configured to perform amplitude decreasing processing on a frequency domain coefficient or a quantization coefficient of a transform block belonging to the flat image content.

With reference to the fourth aspect, in a first possible implementation manner, the image compression apparatus further includes:

a decoding unit, configured to decode the to-be-processed image, to obtain decoding information of the to-be-processed image, where the decoding information includes at least one of the frequency domain coefficient, a quantization matrix, image resolution, and an image size of the to-be-processed image; and a statistical analysis unit, configured to determine a compression strength of the to-be-processed image according to the frequency domain coefficient of the to-be-processed image, or according to a quantization factor in the quantization matrix, or according to the image resolution and the image size; and determine, according to the compression strength, whether compression processing needs to be performed on the to-be-processed image, and in a case in which compression processing needs to be performed, determine a strength of the compression processing.

With reference to the fourth aspect or the first possible implementation manner of the fourth aspect, in a second possible implementation manner, the flatness determining unit is specifically configured to:

determine whether a quadratic sum of all AC coefficients of the transform block is less than a product of a quadratic sum of DC coefficients of the transform block and a constant, where if yes, the image content corresponding to the transform block is flat image content; otherwise, the image content corresponding to the transform block is texture image content.

According to the embodiments of the present invention, amplitude decreasing processing is performed on a frequency domain coefficient of a to-be-processed image according to a texture direction of the to-be-processed image, which can improve the compression efficiency without affecting subjective quality of the to-be-processed image.

According to the following detailed descriptions of exemplary embodiments with reference to the accompanying drawings, other features and aspects of the present invention become clear.

BRIEF DESCRIPTION OF THE DRAWINGS

Accompanying drawings included in the specification and constructing a part of the specification jointly show the exemplary embodiments, characteristics and aspects of the present invention, and are intended to explain the principles of the present invention.

DETAILED DESCRIPTION

The following will describe various exemplary embodiments, features and aspects of the present invention in detail with reference to the accompanying drawings. Like accompanying symbols in the accompanying drawings represent elements with like or similar functions. Although various aspects of the embodiments are illustrated in the accompanying drawing, the accompanying drawings are not necessarily drawn in proportion unless otherwise specified.

The specific term "exemplary" herein means "used as an example, embodiment or illustrative". Any embodiment described as "exemplary" is not necessarily explained as being superior or better than other embodiments.

In addition, for better illustration of the present invention, various specific details are given in the following specific implementation manner. A person of ordinary skill in the art should understand that the present invention may be implemented without the specific details. In some embodiments, methods, means, components, and circuits well known by a person skilled in the art are not described in detail, so that a main purpose of the present invention is highlighted.

Embodiment 1

Figure 1A:
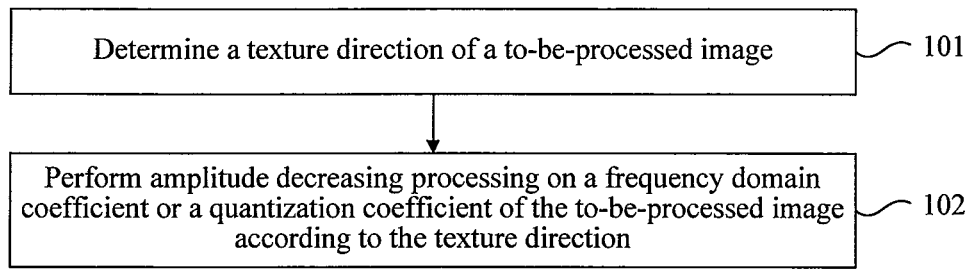
FIG. 1a is a schematic flowchart of an image compression method according to Embodiment 1 of the present invention.

FIG. 1a is a schematic flowchart of an image compression method according to Embodiment 1 of the present invention. As shown in FIG. 1a, the image compression method includes a step of performing amplitude decreasing processing on a frequency domain coefficient or a quantization coefficient of a to-be-processed image, and the image compression method may specifically include:

Step 101: Determine a texture direction of a to-be-processed image.

Figure 1B:
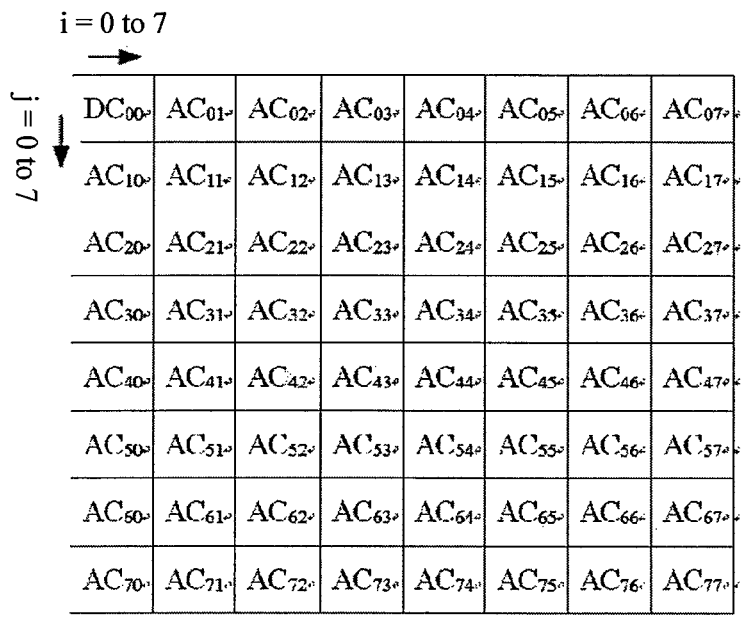
FIG. 1b and FIG. 1c are schematic diagrams of frequency domain coefficients of a transform block in the image compression method according to Embodiment 1 of the present invention.
Figure 1C:
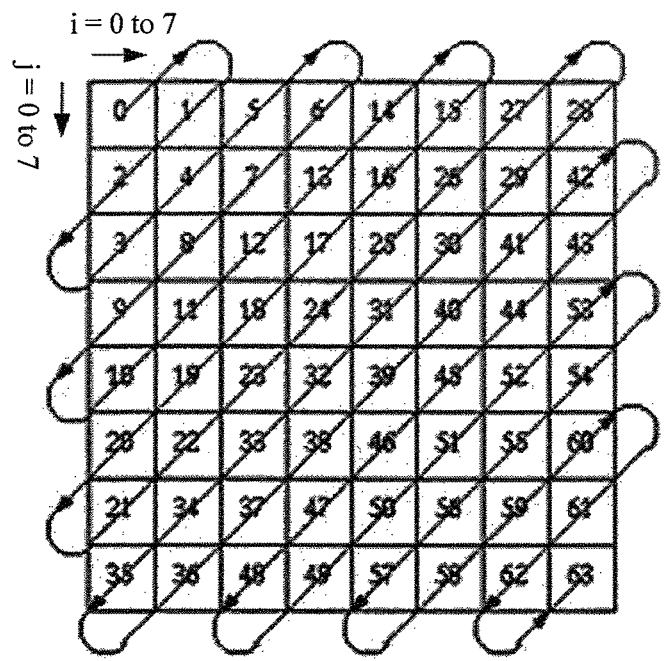

Specifically, frequency domain transform such as discrete cosine transform (Discrete Cosine Transform, DCT for short) may be performed on the to-be-processed image, to obtain a frequency domain coefficient of each transform block of the to-be-processed image. FIG. 1b and FIG. 1c are schematic diagrams of frequency domain coefficients of a transform block in the image compression method according to Embodiment 1 of the present invention. As shown in FIG. 1b, in an 8*8 transform block, frequency domain coefficients are used as an 8*8 matrix, where a transverse direction is represented by i, and a longitudinal direction is represented by j. As shown in FIG. 1c, frequency domain coefficients of an 8*8 transform block may also be arranged in a sequence from 0 to 63.

After the frequency domain coefficients are obtained, the frequency domain coefficients may be quantized according to a quantization factor in a quantization matrix of the to-be-processed image, to obtain quantization coefficients. For example, for a to-be-processed image, a gradually varied quantization matrix may be used, where a quantization factor of a low frequency coefficient of this quantization matrix is relatively small, and a quantization factor of a high frequency quantization factor is relatively large. The quantization matrix may self-adaptively change according to specific content of the to-be-processed image. It may be that multiple images use a same quantization matrix, or it may be that each image corresponds to one quantization matrix, or each transform block corresponds to one quantization matrix. Using 8*8 transform as an example, after transform is performed, an 8*8 quantization matrix is used to quantize a coefficient obtained after transformation, where examples of luminance and chrominance quantization matrices are as follows:

An example of a luminance quantization matrix is:
{16,14,12,20,28,48,62,74,
14,14,16,22,32,70,72,66,
16,16,20,28,48,68,82,68,
22,26,44,68,82,104,96,74,
28,42,66,76,98,124,136,110,
58,76,94,104,124,146,144,122,
86,110,114,118,134,120,124,18}

An example of a chrominance quantization matrix is:
{17,22,28,56,118,118,118,118,
22,26,32,80,118,118,118,118,
28,32,68,118,118,118,118,118,
56,80,118,118,118,118,118,118,
118,118,118,118,118,118,118,118,
118,118,118,118,118,118,118,118,
118,118,118,118,118,118,118,118}

In addition, using an 8*8 transform block as an example, after DCT is performed on the to-be-processed image, 0 to 63 frequency domain coefficients may be obtained, where a transverse direction is represented by i, and i=0 to 7; and a longitudinal direction is represented by j, and j=0 to 7. For a position of each DCT, refer to FIG. 1b. An image texture may mainly be classified into four categories: a horizontal direction, a perpendicular direction, an oblique direction, and other texture directions. For determining of the four categories of textures, the texture direction of the to-be-processed image may be specifically determined according to an alternating current AC coefficient of a frequency domain coefficient of a transform block in the image. For example, the following cases are included:

Case 1: if a frequency domain coefficient $AC_{01}$ of a transform block of the image is 0, and $AC_{10}$ is not 0, the texture direction of the transform block is a horizontal texture.

Case 2: if a frequency domain coefficient $AC_{01}$ of a transform block of the image is not 0, $AC_{10}$ is 0, and a frequency domain coefficient numbered 2 of the transform block is 0, the texture direction of the transform block is a perpendicular texture.

Case 3: if none of frequency domain coefficients $AC_{01}$, $AC_{10}$ and $AC_{11}$ of a transform block of the image is 0, the texture direction of the transform block is an oblique texture.

As shown in FIG. 1b, if the frequency domain coefficients are used as a matrix, $AC_{01}$ is an element whose i=0 and j=1 in the matrix, $AC_{10}$ is an element whose i=1 and j=0 in the matrix, and $AC_{11}$ is an element whose i=1 and j=1 in the matrix. To sum up, the foregoing cases may specifically be represented as the following conditions:

if ($AC_{01}$==0 and $AC_{10}$!=0) is met, it is a horizontal direction;

if ($AC_{01}$!=0 and $AC_{10}$==0) is met, it is a perpendicular direction;

if ($AC_{01}$!=0, $AC_{10}$!=0, and $AC_{11}$!=0) is met, it is an oblique direction; and if none of the foregoing three cases is met, the transform block is texture content without a specific direction.

The foregoing cases are merely examples, and there may be another manner for determining a texture direction. For example: for N*N DCT transform, an N*N frequency domain coefficient matrix is generated, where i=0 to N-1, and j=0 to N-1. If direct current coefficients $AC_{01}$ to $AC_{0m}$ in the first row are 0, and $AC_{10}$ to $AC_{n0}$ in the first column are not 0 (where m and n are less than N), a texture direction of the transform block is a horizontal texture. If direct current coefficients $AC_{01}$ to $AC_{0m}$ in the first row are not 0, and $AC_{10}$ to $AC_{n0}$ in the first column are 0 (where m and n are less than N), a texture direction of the transform block is a perpendicular texture. If direct current coefficients $AC_{01}$ to $AC_{0m}$ in the first row are not 0, $AC_{10}$ to $AC_{n0}$ in the first column are not 0, and AC coefficients whose i=j=0 to t are not 0 (where m, n, and t are less than n), a texture direction of the transform block is an oblique texture.

Step 102: Perform amplitude decreasing processing on the frequency domain coefficient or the quantization coefficient of the to-be-processed image according to the texture direction, where the frequency domain coefficient is a coefficient obtained after the image is transformed, and the quantization coefficient is a coefficient obtained after the frequency domain coefficient is quantized.

Specifically, amplitude decreasing processing refers to reducing an amplitude of an absolute value of the frequency domain coefficient or the quantization coefficient. Step 102 may include: acquiring an energy focused region and a non-energy focused region of the frequency domain coefficient or the quantization coefficient according to the texture direction, where the energy focused region is formed by one or more frequency channel number positions in which a frequency domain coefficient amplitude or a quantization coefficient amplitude is relatively large, and the non-energy focused region is formed by one or more frequency channel number positions in which a frequency domain coefficient amplitude or a quantization coefficient amplitude is relatively small; therefore, a sum of frequency domain coefficient amplitudes or a sum of quantization coefficient amplitudes in the energy focused region is greater than that in the non-energy focused region; in addition, the energy focused region may be formed by one or more neighboring or non-neighboring frequency domain coefficients, and the non-energy focused region may be formed by one or more neighboring or non-neighboring frequency domain coefficients; and then, performing amplitude decreasing processing on one or more frequency domain coefficients or quantization coefficients in the non-energy focused region.

Using an 8*8 transform block as an example, transform blocks may be processed separately according to different texture directions.

(1) When a transform block is a horizontal texture, energy of frequency domain coefficients is focused on frequency channel number positions in which i=0 & j=0 to 7 (the energy focused region); therefore, amplitudes of frequency domain coefficients whose energy is relatively weak and that correspond to some frequency channel number positions in which i=1 to 7 & j=0 to 7 (the non-energy focused region) are processed.

(2) When a transform block is a perpendicular texture, energy of frequency domain coefficients is focused on frequency channel number positions in which i=0 to 7 & j=0 (the energy focused region); therefore, amplitudes of frequency domain coefficients whose energy is relatively weak and that correspond to some frequency channel number positions in which i=0 to 7 & j=1 to 7 (the non-energy focused region) are processed.

(3) When a transform block is an oblique texture, energy of frequency domain coefficients is focused on frequency channel number positions in which i=0 to 1 & j=0 to 1 (the energy focused region); therefore, amplitudes of frequency domain coefficients whose energy is relatively weak and that correspond to some frequency channel number positions in which i=2 to 7 & j=2 to 7 (the non-energy focused region) are processed.

For specific amplitude decreasing processing of frequency domain coefficients, the following manners may be used:

Manner 1: Directly set the frequency domain coefficients to 0.

If N*N transform is used for an image, when a transform block is a horizontal texture, a frequency domain coefficient, with an amplitude of 1, in some coefficients whose i=m to N-1 & j=n to N-1 and for which energy of the transform block is relatively weak may be set to 0, where m≥1 and n≥0;

when a transform block is a perpendicular texture, a frequency domain coefficient, with an amplitude of 1, in some coefficients whose i=m to N-1 & j=n to N-1 and for which energy of the transform block is relatively weak may be set to 0, where m≥0 and n≥1; or when a transform block is an oblique texture, a frequency domain coefficient, with an amplitude of 1, in some coefficients whose I=m+1 to N-1 & j=m+1 to N-1 and for which energy of the transform block is relatively weak may be set to 0, where m≥2 and n≥2.

Using 8*8 transform as an example:

when a transform block is a horizontal texture, a frequency domain coefficient, with an amplitude of 1, in some coefficients whose i=1 to 7 & j=0 to 7 and for which energy of the transform block is relatively weak is set to 0;

when a transform block is a perpendicular texture, a coefficient, with an amplitude of 1, in some coefficients whose i=0 to 7 & j=1 to 7 and for which energy of the transform block is relatively weak is set to 0; or when a transform block is an oblique texture, a coefficient, with an amplitude of 1, in some coefficients whose i=2 to 7 & j=2 to 7 and for which energy of the transform block is relatively weak is set to 0.

For other textures, processing may not be performed, or self-adaptive processing may be performed according to distribution of energy of the frequency domain coefficients. The self-adaptive processing manner is, for example: in a case of other textures, in FIG. 1*c*, position numbers corresponding to the frequency domain coefficients may represent approximate distribution of the energy of the frequency domain coefficients, and smaller position numbers of the frequency domain coefficients indicate higher energy. Therefore, for a frequency domain coefficient with higher energy, less processing is performed, and an amplitude is decreased to a smaller extent, or an amplitude is not decreased; and for a frequency domain coefficient with lower energy, more processing is performed, and an amplitude is decreased to a greater extent. For example:

when i=0 to 3 & j=0 to 3, no processing is performed;

when i=4 to 5 & j=4 to 5, a coefficient with an amplitude of 1 is set to 0; and when i=6 to 7 & j=6 to 7, a coefficient with an amplitude of 2 is set to However, the present invention is not limited to the processing manner. Because energy of each frequency channel number is different, different processing may be performed on each frequency channel number.

Manner 2: Decrease amplitudes of coefficient values.

Using 8*8 transform as an example:

when a transform block is a horizontal texture, a coefficient, with an amplitude of 1, in some coefficients whose i=1 to 7 & j=0 to 7 and for which energy of the transform block is relatively weak is set to 0, and a coefficient with an amplitude of 2 is set to 1;

when a transform block is a perpendicular texture, a coefficient, with an amplitude of 1, in some coefficients whose j=1 to 7 & i=0 to 7 and for which energy of the transform block is relatively weak is set to 0, and a coefficient with an amplitude of 2 is set to 1; and when a transform block is an oblique texture, a coefficient, with an amplitude of 1, in some coefficients whose j=2~7 & i=2~7 and for which energy of the transform block is relatively weak is set to 0, and a coefficient with an amplitude of 2 is set to 1.

For other textures, processing may not be performed, or self-adaptive processing may be performed according to distribution of energy of the frequency domain coefficients. For the self-adaptive processing manner, refer to the related descriptions in manner 1.

In the foregoing examples, amplitudes of the frequency domain coefficients or the quantization coefficients are mostly positive values, and in a case in which an amplitude of a frequency domain coefficient or a quantization coefficient is a negative value, an absolute value of the negative value may be decreased. For example: if an amplitude of a coefficient is −2, amplitude decreasing processing is performed, and the amplitude may be set to −1 or 0.

Figure 1D:
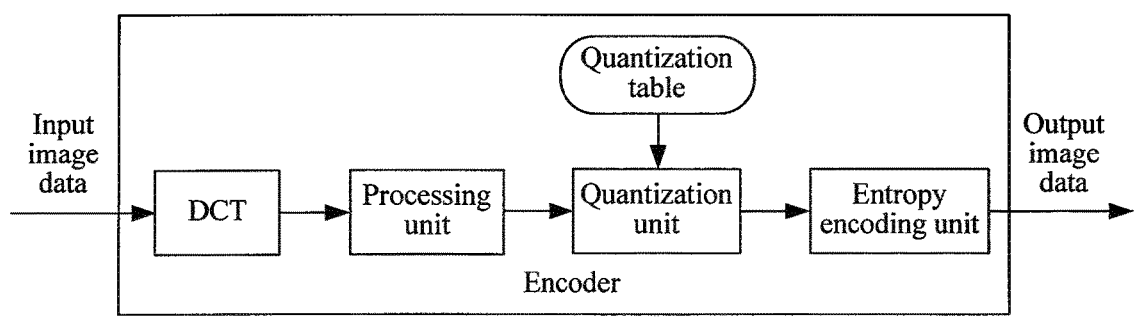
FIG. 1d is a schematic diagram of an encoder used in the image compression method according to Embodiment 1 of the present invention.

In addition, FIG. 1d is a schematic diagram of an encoder used in the image compression method according to Embodiment 1 of the present invention. As shown in FIG. 1d, the encoder (Encoder) may include a discrete cosine transform unit (DCT), a processing unit (Processing), a quantization unit (Quantizer), and an entropy encoding unit (Entropy encoder). The discrete cosine transform unit (DCT) may perform DCT on input image data (Input image data), that is, a to-be-processed image, and the processing unit may be disposed between the discrete cosine transform unit (DCT) and the quantization unit, or may be disposed between the quantization unit and the entropy encoding unit, and configured to perform amplitude decreasing processing on a frequency domain coefficient. The quantization unit may perform quantization processing on a frequency domain coefficient according to a quantization factor in a quantization matrix (Quantization table). By using the entropy encoding unit (Entropy encoder), output image data (Output image data) may be obtained.

In this embodiment, amplitude decreasing processing is performed on a frequency domain coefficient of a to-be-processed image according to a texture direction of the to-be-processed image, which can improve the compression efficiency of the to-be-processed image without affecting subjective quality of the to-be-processed image.

Embodiment 2

Figure 2:
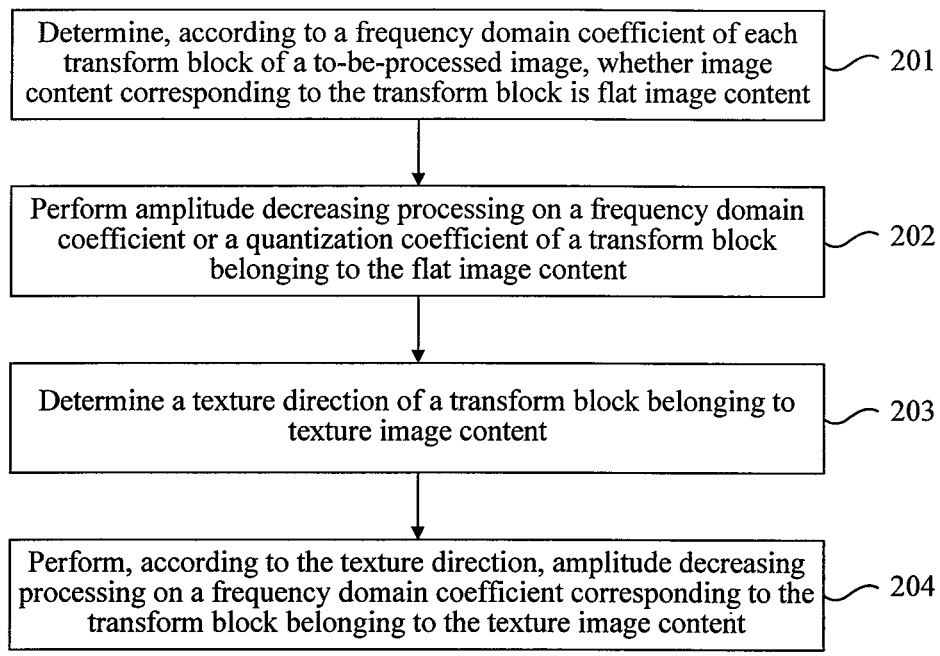
FIG. 2 is a schematic flowchart of an image compression method according to Embodiment 2 of the present invention.

FIG. 2 is a schematic flowchart of an image compression method according to Embodiment 2 of the present invention.

In FIG. 2, components having reference signs the same as those in FIG. 1a have the same functions, and detailed descriptions of these components are omitted for the sake of simplicity.

As shown in FIG. 2, a main difference from the image compression method shown in FIG. 1a lies in that before step 101, the method may include:

Step 201: Determine, according to a frequency domain coefficient of each transform block of a to-be-processed image, whether image content corresponding to the transform block is flat image content.

Specifically, because noise belongs to high-frequency information, if the noise is not filtered out, the compression efficiency of an image may be greatly affected. However, a texture of an image also belongs to high-frequency information; therefore, when noise information is filtered out, many high-frequency signals may also be lost. Therefore, in this embodiment of the present invention, determining flat image content is performed on a to-be-processed image in a frequency domain, to filter out noise of the flat image content. Specifically, it may be determined whether a quadratic sum of all AC coefficients in the transform block is less than a product of a quadratic sum of DC coefficients in the transform block and a constant, where if yes, the image content corresponding to the transform block is flat image content; otherwise, the image content corresponding to the transform block is texture image content. For details, refer to the formula (1):

$$\Sigma AC^2 < a*DC^2 \quad (1)$$

For each transform block, if the formula (1) is met, image content corresponding to the transform block is flat image content; otherwise, image content corresponding to the transform block is texture image content.

In the formula (1), AC is a frequency domain alternating current coefficient (which may be briefly referred to as AC coefficient) of the transform block, DC is a frequency domain direct current coefficient (which may be briefly referred to as DC coefficient) of the transform block, and a is a constant. The DC coefficient represents a low-frequency component in a transform domain; and the AC coefficient represents a high-frequency component in a transform domain. The left side of the formula (1) represents a quadratic sum of all AC coefficients of each transform block, and the right side represents that a quadratic sum of DC coefficients of each transform block is multiplied by a constant, where a in this embodiment of the present invention may be an empirical value such as 0.02. DCT is transforming a to-be-processed image in a data domain from a time (space) domain to a frequency domain. Referring to FIG. 1b, an example in which 8*8 DCT is performed on an image is used: an image is divided into multiple 8*8 blocks, DCT may be performed on each block to obtain a transform block, each transform block includes 8*8 DCT coefficients, which is equivalent to an 8*8 matrix, and a DCT transform coefficient on a frequency domain plane may be represented by using a function of two-dimensional frequency domain variables i and j, where i=0 to 7 and j=0 to 7. A frequency domain coefficient that is in the transform block and corresponds to a frequency channel number position in which i=0 and j=0 is a DC coefficient, and the DC coefficient may also be referred to as a direct current component of the frequency domain coefficient; frequency domain coefficients of the rest 63 frequency channel number positions are AC coefficients, and the AC coefficients may also be referred to as alternating current components of the frequency domain coefficients.

Step 202: Perform amplitude decreasing processing on a frequency domain coefficient or a quantization coefficient of a transform block belonging to the flat image content.

Specifically, flat image content and texture image content may be distinguished in the to-be-processed image according to the frequency domain coefficient of each transform block of the to-be-processed image, and filtering processing is performed on a transform block belonging to the flat image content, so that an amplitude of a frequency domain coefficient of the transform block belonging to the flat image content may be decreased. For example, a Gaussian frequency domain filter is used to process the frequency domain coefficient of the transform block belonging to the flat image content, and a specific processing method may be as follows:

Assuming that 8*8 DCT is used for the to-be-processed image, a Gaussian frequency domain filter may be designed as an 8*8 filter, and then in an 8*8 region, each frequency domain coefficient of a transform block is multiplied by a filter coefficient of a corresponding position of the frequency domain coefficient, to obtain a finally processed frequency domain coefficient value.

A strength of the Gaussian frequency domain filter may be self-adaptively adjusted according to image content or a quantization factor in a quantization matrix. The coefficient DC (the number on the top left corner after the DCT) may not be processed; therefore, a filter coefficient corresponding to the DC is always 1.

Assuming that a parameter sigma=6 used to adjust a filter strength in the filter is used, for a filter coefficient, reference may be made to the formula (2):

$$\text{Filter } [DCTSIZE] = \begin{Bmatrix} 1, 0.986, 0.946, 0.882, 0.801, 0.882, 0.946, 0.986, \\ 0.986, 0.973, 0.933, 0.870, 0.790, 0.870, 0.933, 0.973, \\ 0.946, 0.933, 0.895, 0.835, 0.757, 0.835, 0.895, 0.933, \\ 0.882, 0.870, 0.835, 0.779, 0.707, 0.779, 0.835, 0.870, \\ 0.801, 0.790, 0.757, 0.707, 0.641, 0.707, 0.757, 0.790, \\ 0.882, 0.870, 0.835, 0.779, 0.707, 0.779, 0.835, 0.870, \\ 0.946, 0.933, 0.895, 0.835, 0.757, 0.835, 0.895, 0.933, \\ 0.986, 0.973, 0.933, 0.870, 0.790, 0.870, 0.933, 0.973 \end{Bmatrix} \quad (2)$$

In addition, filters with different strengths may be used for different texture directions; or a frequency domain coefficient amplitude or a quantized coefficient amplitude may directly be adjusted for a different texture direction.

Amplitude decreasing processing may be performed on a frequency domain coefficient of a to-be-processed image according to a texture direction, and refer to Embodiment 1. Alternatively, amplitude decreasing processing may be performed only on a frequency domain coefficient of texture image content according to a texture direction; in this way, step 101 may specifically include:

Step 203: Determine a texture direction of a transform block belonging to texture image content, where the transform block belonging to the texture image content is a transform block that is in the to-be-processed image and does not belong to the flat image content.

Moreover, step 102 may specifically include:

Step 204: Perform, according to the texture direction, amplitude decreasing processing on a frequency domain coefficient corresponding to the transform block belonging to the texture image content.

In this embodiment, amplitude decreasing processing is performed on a frequency domain coefficient corresponding to a transform block of a to-be-processed image according to a texture direction of the to-be-processed image, which can improve the compression efficiency without affecting subjective quality of the to-be-processed image.

Further, filtering processing is performed on flat image content of the to-be-processed image, to filter out noise of the flat image content, which can improve the compression efficiency and reduce occupied bandwidth without affecting subjective quality of the image, and moreover, the to-be-processed image does not lose texture details either.

Embodiment 3

Figure 3A:
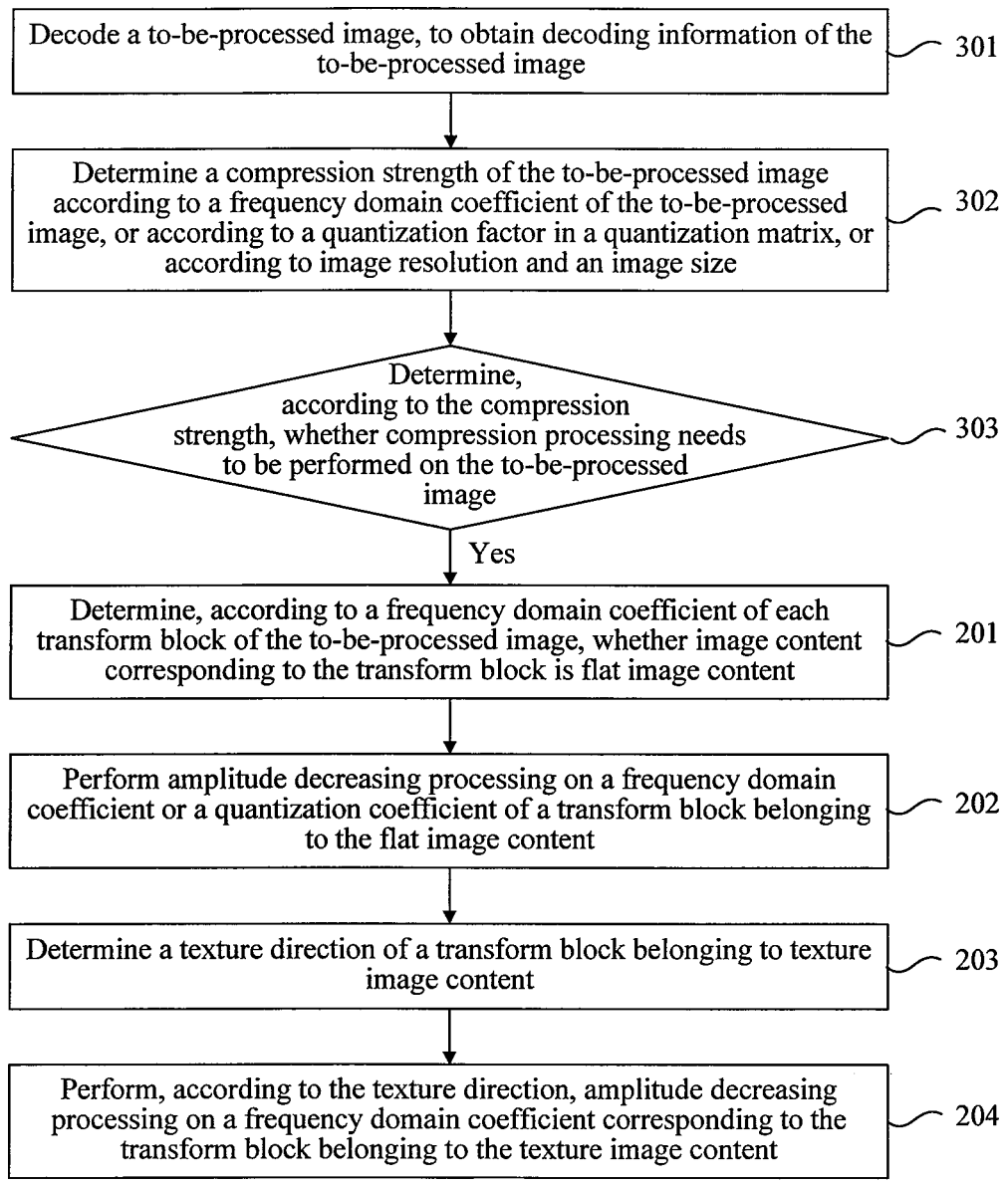
FIG. 3a is a schematic flowchart of an image compression method according to Embodiment 3 of the present invention.

FIG. 3*a* is a schematic flowchart of an image compression method according to Embodiment 3 of the present invention. In FIG. 3*a*, components having reference signs the same as those in FIG. 1*a* and FIG. 2 have the same functions, and detailed descriptions of these components are omitted for the sake of simplicity.

As shown in FIG. 3*a*, a main difference from the image compression method shown in FIG. 1*a* and FIG. 2 lies in that before step 101, the method may further include:

Step 301: Decode the to-be-processed image, to obtain decoding information of the to-be-processed image, where the decoding information includes at least one of the frequency domain coefficient, a quantization matrix, image resolution, and an image size of the to-be-processed image.

Specifically, compression processing may have been performed on the to-be-processed image, a JPEG standard decoder may be used to decode the compressed image, and previous decoding information of the to-be-processed image may be directly obtained, where the decoding information may mainly include a frequency domain coefficient, a quantization factor, image resolution, an image size, and the like. After statistical analysis is performed on the previous decoding information of the to-be-processed image, a processing manner and a processing strength for subsequent encoding may be obtained; and then, when the to-be-processed image is encoded again, the image compression method in the foregoing Embodiment 1 or Embodiment 2 may be used to perform corresponding processing and encoding on each to-be-processed image.

Step 302: Determine a compression strength of the to-be-processed image according to the frequency domain coefficient of the to-be-processed image, or according to a quantization factor in the quantization matrix, or according to the image resolution and the image size.

Step 303: Determine, according to the compression strength, whether compression processing needs to be performed on the to-be-processed image, and in a case in which compression processing needs to be performed, determine a strength of the compression processing. If compression processing needs to be performed on the to-be-processed image, perform step 101 or step 201 again; otherwise, skip performing step 101 or step 201.

Specifically, specific scenarios in which a compression strength is determined according to one or more of a quantization matrix (Qtable), a frequency domain coefficient (coef), image resolution, and a size obtained after compression is performed in different decoding information are as follows:

Scenario 1: The compression strength is determined according to the quantization matrix (Qtable).

When the compression strength is determined by using a quantization matrix and a quantization factor that corresponds to a frequency domain coefficient of the top left corner of the transform block, an example in which a compression strength (level) is determined by using a quantization factor (Qtable0) corresponding to a DC coefficient, the following manners may be used:

(1) when Qtable0<4, the compression strength level=2;
(2) when 4<Qtable0<8, the compression strength level=1; or
(3) when Qtable0>8, the compression strength level=0, that is, image compression cannot be performed any more, and subjective quality of the image may be affected if compression is further performed; in this case, the to-be-processed image may not be processed.

Scenario 2: The compression strength is determined according to a value of a frequency domain coefficient (coef), where a quantity of frequency domain coefficients is not limited, for example, the frequency domain coefficient may be a DC coefficient, may be an AC coefficient, or may be a DC+AC coefficient.

Content of a current block is determined according to a quantity of frequency domain coefficients whose amplitudes are 0 in a specified frequency channel number position, and then a compression strength of the block is determined, to determine a quantization factor.

For example, according to the position in FIG. 1c, the following manners may be used:

(1) when a quantity of medium and high frequency channel numbers whose amplitudes are 0 and that are in positions 20 to 63 is greater than or equal to 30, it indicates that the image has a relatively small quantity of textures; in this case, the compression strength may be relatively strong, where level=2;

(2) when a quantity of medium and high frequency channel numbers whose amplitudes are 0 and that are in positions 28 to 63 is between 15 and 30, it indicates that the image has a medium quantity of textures; in this case, the compression strength may be relatively weak, where level=1; or (3) when a quantity of medium and high frequency channel numbers whose amplitudes are 0 and that are in positions 28 to 63 is between 0 and 15, it indicates that the image has a medium quantity of textures; in this case, compression may not be further performed, where level=0.

The compression strength may be determined by using a transform block as a unit; besides, the compression strength may be determined by using a region as a unit, or by using an image as a unit. In the determining manner, the quantities of frequency domain coefficients whose amplitudes are 0 and that are in specified frequency channel number positions in each transform block may be accumulated and averaged, content of a current region or image is obtained through analysis, and then a compression strength and a quantization factor are determined.

Scenario 3: A new compression strength is determined according to image resolution, and a size of a compressed image.

The image size and the image resolution are specifically represented as follows:

image size (byte)=image width*image length*bit width/8;

and image resolution=image width*image length.

For example: a size of a 1024*768 8-bit image is 1024*768*8/8=786432 byte=768 KB.

For an example of determining a compression strength according to the image resolution and size, reference may be made to the following Table 1:

TABLE 1

| Image resolution | Image size (MB) | Compression strength (level) |
| --- | --- | --- |
| 8 MP and higher (8 MP and higher) | >4 | 3 |
| | 2~4 | 2 |
| | 1~2 | 1 |
| | >1 | 0 |
| 3-7 MP | 2~4 | 2 |
| | 1~2 | 1 |
| | <1 | 0 |
| 1-2 MP | 1~2 | 2 |
| | 0.5~1 | 1 |
| | <0.5 | 0 |
| Lower than 1 MP (Lower than 1 MP) | 0.1~0.5 | 1 |
| | <0.1 | 0 |

In the foregoing scenario, different compression strengths may correspond to different quantization matrices, a quantization matrix corresponding to a large strength has a large quantization factor, and a quantization matrix corresponding to a small strength has a small quantization factor; quantization matrices corresponding to a same compression strength of different images may be the same or may be different; for different compression strengths, quantization factors in a same frequency channel number position may be the same or may be different; and in a quantization matrix, a quantization factor corresponding to an AC coefficient is generally greater than or equal to a quantization factor corresponding to a DC coefficient.

Moreover, in the foregoing scenario, the quantization matrix may self-adaptively change according to image content. It may be that multiple images use a same quantization matrix, and it may be that each image corresponds to a quantization matrix, each region corresponds to a quantization matrix, and each block corresponds to a quantization matrix. Quantization matrices may be the same or may be different. During encoding, a new quantization matrix is used to quantize an image.

Figure 3B:
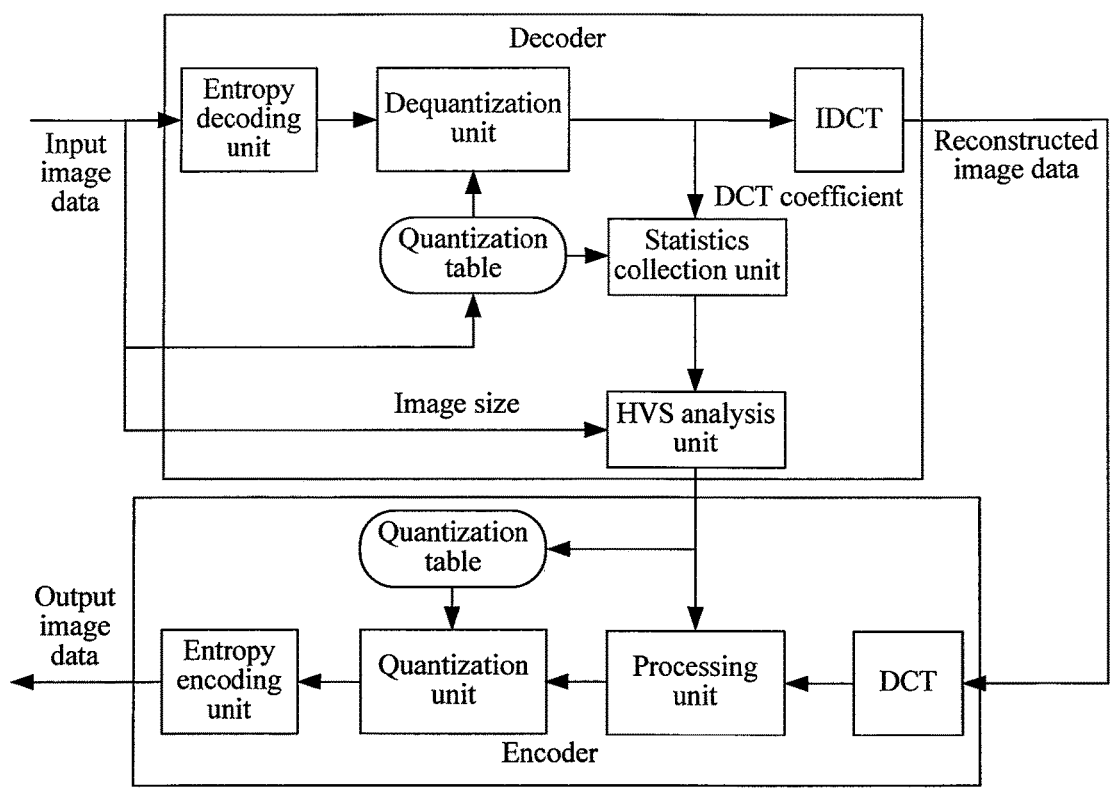
FIG. 3b is a schematic diagram of an encoder and a decoder used in the image compression method according to Embodiment 3 of the present invention.

In addition, FIG. 3b is a schematic diagram of an encoder and a decoder used in the image compression method according to Embodiment 3 of the present invention. As shown in FIG. 3b, the decoder (Decoder) may include: an entropy decoding unit (Entropy Encoder), a dequantization unit (Dequantizer), an inverse discrete cosine transform unit (IDCT), a statistics collection unit (Statistics), and a human visual system (HVS) analysis unit (HVS analysis). The decoder decodes input image data (Input image data) by using the entropy decoding unit (Entropy Encoder), the dequantization unit (Dequantizer), and the inverse discrete cosine transform unit (IDCT), and obtained reconstructed image data (reconstructed image data) is a to-be-processed image. The statistics collection unit (Statistics) and the human visual system (HVS) analysis unit (HVS analysis) are configured to determine whether to perform compression processing on the reconstructed image data (reconstructed image data). If yes, the encoder (Encoder) performs compression processing on the reconstructed image data (reconstructed image data); otherwise, the encoder may not perform compression processing on the reconstructed image data (reconstructed image data). The encoder may include a discrete cosine transform unit (DCT), a processing unit (Processing), a quantization unit (Quantizer), and an entropy encoding unit (Entropy encoder). The discrete cosine transform unit (DCT) may perform DCT on the reconstructed image data (reconstructed image data), the processing unit may be disposed between the discrete cosine transform unit (DCT) and the quantization unit, or may be disposed between the quantization unit and the entropy encoding unit, and configured to perform amplitude decreasing processing on a frequency domain coefficient. The quantization unit may perform quantization processing on the frequency domain coefficient according to a quantization factor in a quantization matrix (Quantization table). By using the entropy encode unit (Entropy encoder), output image data (Output image data) may be obtained.

In this embodiment, amplitude decreasing processing is performed on a frequency domain coefficient of a to-be-processed image according to a texture direction of the to-be-processed image, which can improve the compression efficiency of the to-be-processed image without affecting subjective quality of the to-be-processed image.

Further, filtering processing is performed on flat image content of the to-be-processed image, to filter out noise of the flat image content, which can improve the compression efficiency and reduce occupied bandwidth without affecting subjective quality of the image, and moreover, the to-be-processed image does not lose texture details either.

In addition, for decoding a compressed to-be-processed image, previous decoding information of the image may be acquired in advance, so as to determine, according to a compression strength of the image, whether the image can be further compressed, which is more advantageous for controlling subjective quality of the compressed image.

Embodiment 4

Figure 4:
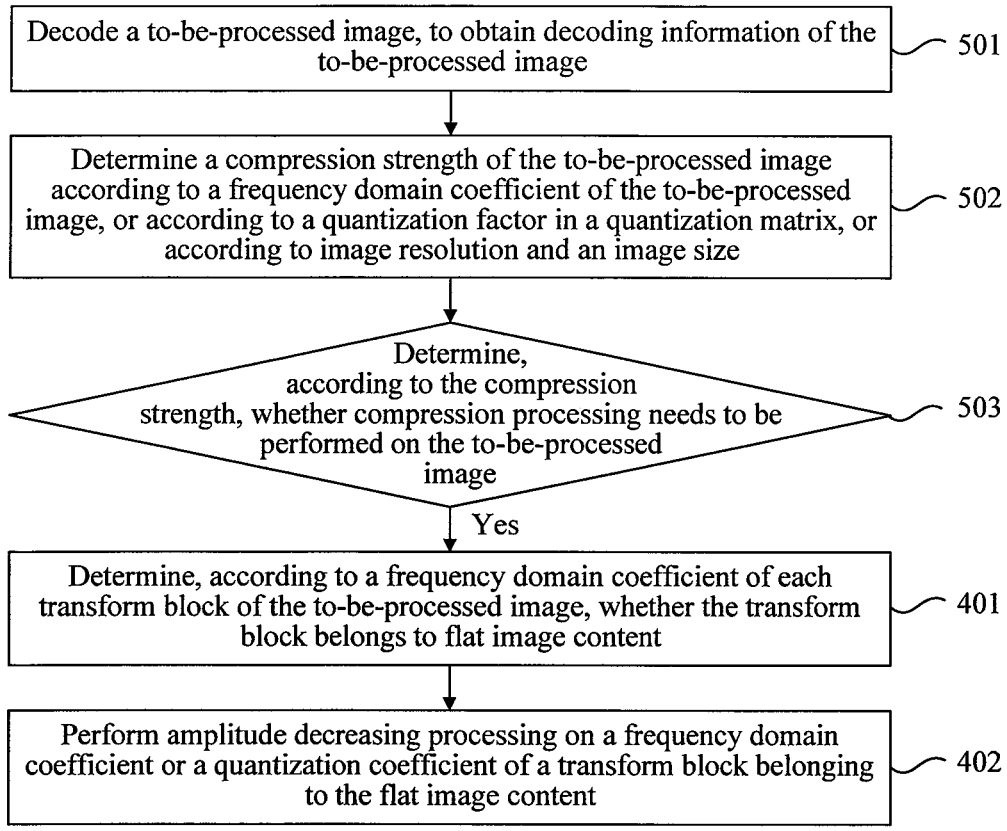
FIG. 4 is a schematic flowchart of an image compression method according to Embodiment 4 of the present invention.

FIG. 4 is a schematic flowchart of an image compression method according to Embodiment 4 of the present invention. As shown in FIG. 4, the image compression method may include a step of performing amplitude decreasing processing on a frequency domain coefficient or a quantization coefficient of a to-be-processed image, and the image compression method may specifically include:

Step 401: Determine, according to a frequency domain coefficient of each transform block of a to-be-processed image, whether the transform block belongs to flat image content.

Specifically, it may be determined whether a quadratic sum of all AC coefficients of the transform block is less than a product of a quadratic sum of DC coefficients of the transform block and a constant, where if yes, image content corresponding to the transform block is flat image content; otherwise, image content corresponding to the transform block is texture image content. For details, reference may be made to the formula (1) and the related descriptions in the foregoing embodiment.

Step 402: Perform amplitude decreasing processing on a frequency domain coefficient or a quantization coefficient of a transform block belonging to the flat image content.

Specifically, for step 401, refer to the related descriptions of the process of determining flat image content in Embodiment 2, and for step 402, refer to the related descriptions of the process of the amplitude decreasing processing in Embodiment 1.

Further, before step 401, the method may further include:

Step 501: Decode the to-be-processed image, to obtain decoding information of the to-be-processed image, where the decoding information includes at least one of the frequency domain coefficient, a quantization matrix, image resolution, and an image size of the to-be-processed image.

Step 502: Determine a compression strength of the to-be-processed image according to the frequency domain coefficient of the to-be-processed image, or according to a quantization factor in the quantization matrix, or according to the image resolution and the image size.

Step 503: Determine, according to the compression strength, whether compression processing needs to be performed on the to-be-processed image, and in a case in which compression processing needs to be performed, determine a strength of the compression processing.

Specifically, for step 501 to step 503, refer to the related descriptions of the process of determining a compression strength in the foregoing Embodiment 3.

In this embodiment, filtering processing is performed on flat image content of the to-be-processed image, to filter out noise of the flat image content, which can improve the compression efficiency and reduce occupied bandwidth without affecting subjective quality of the image, and moreover, the to-be-processed image does not lose texture details either.

In addition, for decoding a compressed to-be-processed image, previous decoding information of the image may be acquired in advance, so as to determine, according to a compression strength of the image, whether the image can be further compressed, which is more advantageous for controlling subjective quality of the compressed image.

Embodiment 5

Figure 5:
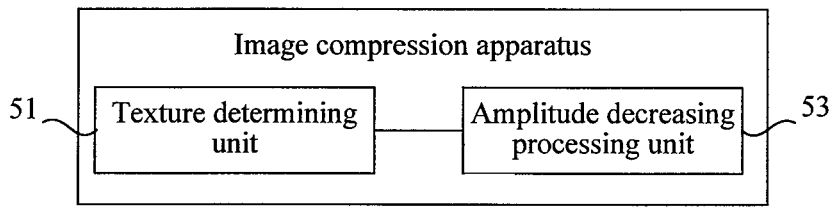
FIG. 5 is a structural block diagram of an image compression apparatus according to Embodiment 5 of the present invention.

FIG. 5 is a structural block diagram of an image compression apparatus according to Embodiment 5 of the present invention. As shown in FIG. 5, the image compression apparatus may include:

a texture determining unit 51, configured to determine a texture direction of a to-be-processed image; and an amplitude decreasing processing unit 53, configured to perform amplitude decreasing processing on a frequency domain coefficient or a quantization coefficient of the to-be-processed image according to the texture direction, where the frequency domain coefficient is a coefficient obtained after the image is transformed, and the quantization coefficient is a coefficient obtained after the frequency domain coefficient is quantized.

Specifically, the texture determining unit 51 may determine the texture direction of the to-be-processed image according to a frequency domain AC coefficient of the to-be-processed image. After frequency domain transform such as DCT is performed on the to-be-processed image, a frequency domain coefficient of each transform block may be obtained, and then the texture direction of the to-be-processed image may be determined according to the frequency domain coefficient. Specifically, for explanations and examples of frequency domain transform and texture direction determining, refer to the related descriptions of Embodiment 1, and no further details are described herein again.

Then, the amplitude decreasing processing unit 53 may perform amplitude decreasing processing on the frequency domain coefficient or the quantization coefficient of the to-be-processed image according to the texture direction, where the quantization coefficient is a coefficient for quantizing a frequency domain coefficient according to a quantization matrix. For specific explanations and examples of the quantization matrix and amplitude decreasing processing, refer to the related descriptions of Embodiment 1, and no further details are described herein again.

The image compression apparatus in this embodiment performs amplitude decreasing processing on a frequency domain coefficient of a to-be-processed image according to a texture direction of the to-be-processed image, which can improve the compression efficiency of the to-be-processed image without affecting subjective quality of the to-be-processed image.

Embodiment 6

Figure 6:
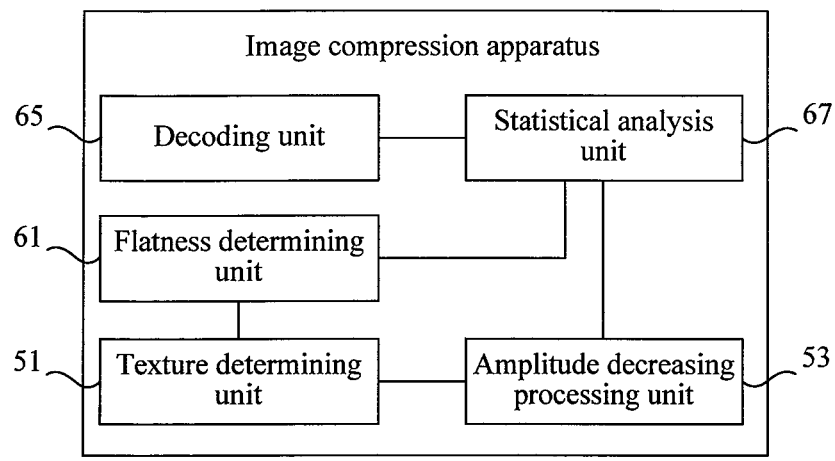
FIG. 6 is a structural block diagram of an image compression apparatus according to Embodiment 6 of the present invention.

FIG. 6 is a structural block diagram of an image compression apparatus according to Embodiment 6 of the present invention. In FIG. 6, components having reference signs the same as those in FIG. 5 have the same functions, and detailed descriptions of these components are omitted for the sake of simplicity.

As shown in FIG. 6, the amplitude decreasing processing unit 53 of the image compression apparatus may be specifically configured to acquire an energy focused region and a non-energy focused region of the frequency domain coefficient or the quantization coefficient according to the texture direction, where a sum of frequency domain coefficient amplitudes or a sum of quantization coefficient amplitudes in the energy focused region is greater than that in the non-energy focused region; and perform amplitude decreasing processing on one or more frequency domain coefficients or quantization coefficients in the non-energy focused region. For specific explanations and examples of the energy focused region and the non-energy focused region, refer to the related descriptions of Embodiment 1, and no further details are described herein again.

In a possible implementation manner, the image compression apparatus may further include:

a flatness determining unit 61, configured to determine, according to a frequency domain coefficient of each transform block of a to-be-processed image, whether image content corresponding to the transform block is flat image content, where the transform block is a block that is obtained by dividing the to-be-processed image in advance and on which frequency domain transform is performed, where for specific explanations and examples of the flat image content, refer to the related descriptions of Embodiment 2, and no further details are described herein again, where the amplitude decreasing processing unit 53 is further configured to perform amplitude decreasing processing on a frequency domain coefficient or a quantization coefficient of a transform block belonging to the flat image content.

In a possible implementation manner, the texture determining unit 51 may be further configured to determine a texture direction of a transform block belonging to texture image content, where the transform block belonging to the texture image content is a transform block that is in the to-be-processed image and does not belong to the flat image content; and the amplitude decreasing processing unit 53 is further configured to perform, according to the texture direction, amplitude decreasing processing on a frequency domain coefficient or a quantization coefficient corresponding to the transform block belonging to the texture image content.

In a possible implementation manner, the image compression apparatus may further include:

a decoding unit 65, configured to decode the to-be-processed image, to obtain decoding information of the to-be-processed image, where the decoding information includes at least one of the frequency domain coefficient, a quantization matrix, image resolution, and an image size of the to-be-processed image; and a statistical analysis unit 67, configured to determine a compression strength of the to-be-processed image according to the frequency domain coefficient of the to-be-processed image, or according to a quantization factor in the quantization matrix, or according to the image resolution and the image size; and determine, according to the compression strength, whether compression processing needs to be performed on the to-be-processed image, and in a case in which compression processing needs to be performed, determine a strength of the compression processing.

The decoding unit 65 may decode a to-be-processed image on which compression processing is already performed, and the statistical analysis unit 67 determines a compression strength according to decoding information, so as to determine whether compression needs to be further performed. For a specific process, refer to the related descriptions of Embodiment 3 and FIG. 3b, and no further details are described herein again.

The frequency domain coefficient may include a direct current DC coefficient and an alternating current AC coefficient. In a possible implementation manner, the texture determining unit 51 may be specifically configured to determine, according to a frequency domain AC coefficient of a transform block in the image, a texture direction of a to-be-processed image corresponding to the transform block.

In a possible implementation manner, the flatness determining unit 61 may be specifically configured to: determine whether a quadratic sum of all AC coefficients in the transform block is less than a product of a quadratic sum of DC coefficients in the transform block and a constant, where if yes, the image content corresponding to the transform block is flat image content; otherwise, the image content corresponding to the transform block is texture image content. For details, refer to the formula (2) and the related descriptions in the foregoing image compression method embodiment.

The image compression apparatus in this embodiment performs amplitude decreasing processing on a frequency domain coefficient of a to-be-processed image according to a texture direction of the to-be-processed image, which can improve the compression efficiency of the to-be-processed image without affecting subjective quality of the to-be-processed image.

Further, filtering processing is performed on flat image content of the to-be-processed image, to filter out noise of the flat image content, which can improve the compression efficiency and reduce occupied bandwidth without affecting subjective quality of the image, and moreover, the to-be-processed image does not lose texture details either.

In addition, for decoding a compressed to-be-processed image, previous decoding information of the image may be acquired in advance, so as to determine, according to a compression strength of the image, whether the image can be further compressed, which is more advantageous for controlling subjective quality of the compressed image.

Embodiment 7

Figure 7:
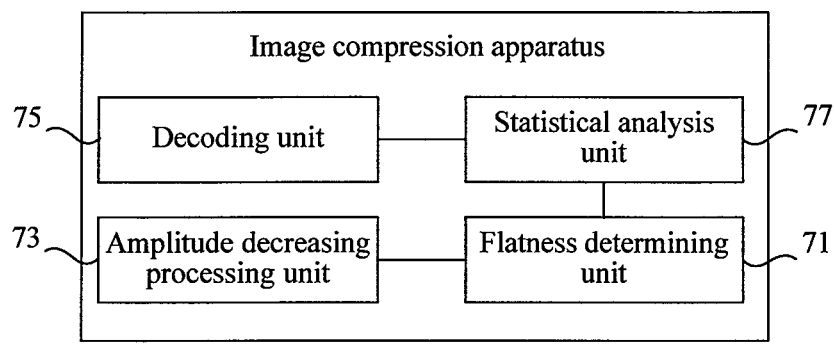
FIG. 7 is a structural block diagram of an image compression apparatus according to Embodiment 7 of the present invention.

FIG. 7 is a structural block diagram of an image compression apparatus according to Embodiment 7 of the present invention. As shown in FIG. 7, the image compression apparatus may include:

a flatness determining unit 71, configured to determine, according to a frequency domain coefficient of each transform block of a to-be-processed image, whether image content corresponding to the transform block is flat image content, where the transform block is a block that is obtained by dividing the to-be-processed image in advance and on which frequency domain transform is performed; and an amplitude decreasing processing unit 73, configured to perform amplitude decreasing processing on a frequency domain coefficient or a quantization coefficient of a transform block belonging to the flat image content.

For specific explanations and examples of the flat image content, refer to the related descriptions of Embodiment 2, and no further details are described herein again.

In a possible implementation manner, the image compression apparatus may further include:

a decoding unit 75, configured to decode the to-be-processed image, to obtain decoding information of the to-be-processed image, where the decoding information includes at least one of the frequency domain coefficient, a quantization matrix, image resolution, and an image size of the to-be-processed image; and a statistical analysis unit 77, configured to determine a compression strength of the to-be-processed image according to the frequency domain coefficient of the to-be-processed image, or according to a quantization factor in the quantization matrix, or according to the image resolution and the image size; and determine, according to the compression strength, whether compression processing needs to be performed on the to-be-processed image, and in a case in which compression processing needs to be performed, determine a strength of the compression processing.

The decoding unit 75 may decode a to-be-processed image on which compression processing is already performed, and the statistical analysis unit 77 determines a compression strength according to decoding information, so as to determine whether compression needs to be further performed. For a specific process, refer to the related descriptions of Embodiment 3 and FIG. 3b, and no further details are described herein again.

In a possible implementation manner, the flatness determining unit may be specifically configured to: determine whether a quadratic sum of all AC coefficients in the transform block is less than a product of a quadratic sum of DC coefficients in the transform block and a constant, where if yes, the image content corresponding to the transform block is flat image content; otherwise, the image content corresponding to the transform block is texture image content. For details, refer to the formula (2) and the related descriptions in the foregoing image compression method embodiment.

The image compression apparatus in this embodiment performs filtering processing on flat image content of a to-be-processed image, to filter out noise of the flat image content, which can improve the compression efficiency and reduce occupied bandwidth without affecting subjective quality of the image, and moreover, the to-be-processed image does not lose texture details either.

In addition, for decoding a compressed to-be-processed image, previous decoding information of the image may be acquired in advance, so as to determine, according to a compression strength of the image, whether the image can be further compressed, which is more advantageous for controlling subjective quality of the compressed image.

Embodiment 8

Figure 8:
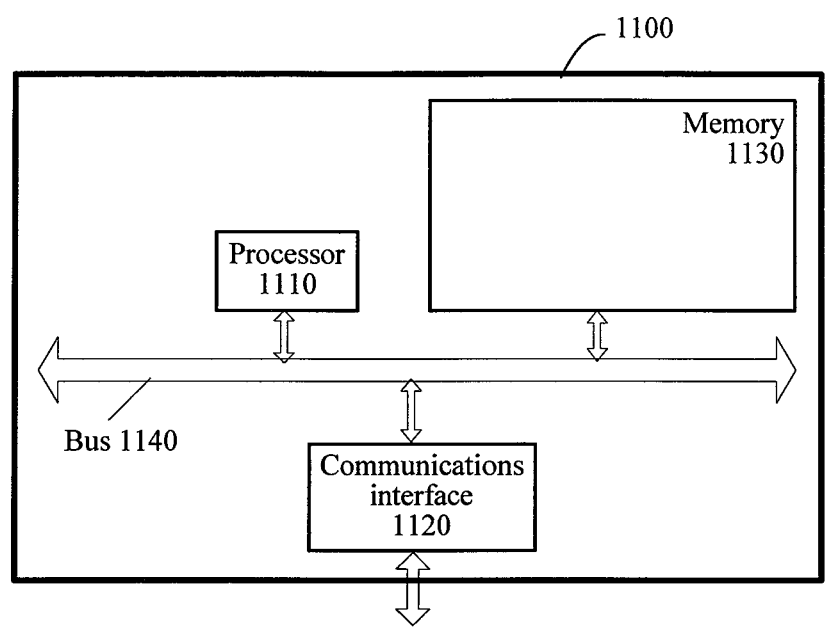
FIG. 8 is a structural block diagram of an image compression apparatus according to Embodiment 8 of the present invention.

FIG. 8 is a structural block diagram of an image compression apparatus according to Embodiment 8 of the present invention. The image compression apparatus 1100 may be a host server having a computing capability, a personal computer PC, or a portable computer or terminal. The specific embodiment of the present invention does not limit specific implementation of a computing node.

The image compression apparatus 1100 includes a processor (processor) 1110, a communications interface (Communications Interface) 1120, a memory (memory) 1130, and a bus 1140. The processor 1110, the communications interface 1120, and the memory 1130 communicate with each other by using the bus 1140.

The communications interface 1120 is configured to communicate with a network device, where the network device includes, for example, a virtual machine management center or a shared memory.

The processor 1110 is configured to execute a program. The processor 1110 may be a central processing unit CPU, or an application specific integrated circuit ASIC (Application Specific Integrated Circuit), or one or more integrated circuits configured to implement this embodiment of the present invention.

The memory 1130 is configured to store a program and data. The memory 1130 may include a high-speed RAM memory, or may include a non-volatile memory (non-volatile memory), for example, at least one magnetic disk memory. The memory 1130 may be a memory array. The memory 1130 may be further divided into blocks, and the blocks may be combined into a virtual volume according to a rule.

In a possible implementation manner, the foregoing program may be program code including a computer operation instruction. The program may be specifically used to execute an image compression method, including a step of performing amplitude decreasing processing on a frequency domain coefficient or a quantization coefficient of a to-be-processed image, where the image compression method includes:

determining a texture direction of the to-be-processed image; and performing amplitude decreasing processing on the frequency domain coefficient or the quantization coefficient of the to-be-processed image according to the texture direction, where the frequency domain coefficient is a coefficient obtained after the image is transformed, and the quantization coefficient is a coefficient obtained after the frequency domain coefficient is quantized.

In a possible implementation manner, the performing amplitude decreasing processing on the frequency domain coefficient or the quantization coefficient of the to-be-processed image according to the texture direction includes:

acquiring an energy focused region and a non-energy focused region of the frequency domain coefficient or the quantization coefficient according to the texture direction, where a sum of frequency domain coefficient amplitudes or a sum of quantization coefficient amplitudes in the energy focused region is greater than that in the non-energy focused region; and performing amplitude decreasing processing on one or more frequency domain coefficients or quantization coefficients in the non-energy focused region.

In a possible implementation manner, before the determining a texture direction of the to-be-processed image, the method further includes:

determining, according to a frequency domain coefficient of each transform block of the to-be-processed image, whether image content corresponding to the transform block is flat image content, where the transform block is a block that is obtained by dividing the to-be-processed image in advance and on which frequency domain transform is performed; and performing amplitude decreasing processing on a frequency domain coefficient or a quantization coefficient of a transform block belonging to the flat image content.

In a possible implementation manner, the determining a texture direction of the to-be-processed image includes: determining a texture direction of a transform block belonging to texture image content, where the transform block belonging to the texture image content is a transform block that is in the to-be-processed image and does not belong to the flat image content; and the performing amplitude decreasing processing on the frequency domain coefficient or the quantization coefficient of the to-be-processed image according to the texture direction includes: performing, according to the texture direction, amplitude decreasing processing on a frequency domain coefficient or a quantization coefficient corresponding to the transform block belonging to the texture image content.

In a possible implementation manner, before the determining a texture direction of the to-be-processed image, the method further includes:

decoding the to-be-processed image, to obtain decoding information of the to-be-processed image, where the decoding information includes at least one of the frequency domain coefficient, a quantization matrix, image resolution, and an image size of the to-be-processed image;

determining a compression strength of the to-be-processed image according to the frequency domain coefficient of the to-be-processed image, or according to a quantization factor in the quantization matrix, or according to the image resolution and the image size; and determining, according to the compression strength, whether compression processing needs to be performed on the to-be-processed image, and in a case in which compression processing needs to be performed, determining a strength of the compression processing.

In a possible implementation manner, the frequency domain coefficient includes a direct current DC coefficient and an alternating current AC coefficient, and the determining a texture direction of the to-be-processed image includes:

determining, according to a frequency domain AC coefficient of a transform block in the image, a texture direction of a to-be-processed image corresponding to the transform block.

In a possible implementation manner, the frequency domain coefficient includes a direct current DC coefficient and an alternating current AC coefficient, and the determining, according to a frequency domain coefficient of each transform block of the to-be-processed image, whether image content corresponding to the transform block is flat image content includes:

determining whether a quadratic sum of all AC coefficients of the transform block is less than a product of a quadratic sum of DC coefficients of the transform block and a constant, where if yes, the image content corresponding to the transform block is flat image content; otherwise, the image content corresponding to the transform block is texture image content.

Further, the program may further be specifically used to execute an image compression method, including a step of performing amplitude decreasing processing on a frequency domain coefficient or a quantization coefficient of a to-be-processed image, where the image compression method includes:

determining, according to a frequency domain coefficient of each transform block of the to-be-processed image, whether image content corresponding to the transform block is flat image content, where the transform block is a block that is obtained by dividing the to-be-processed image in advance and on which frequency domain transform is performed; and performing amplitude decreasing processing on a frequency domain coefficient or a quantization coefficient of a transform block belonging to the flat image content.

In a possible implementation manner, before the determining, according to a frequency domain coefficient of each transform block of the to-be-processed image, whether image content corresponding to the transform block is flat image content, the method further includes:

decoding the to-be-processed image, to obtain decoding information of the to-be-processed image, where the decoding information includes at least one of the frequency domain coefficient, a quantization matrix, image resolution, and an image size of the to-be-processed image;

determining a compression strength of the to-be-processed image according to the frequency domain coefficient of the to-be-processed image, or according to a quantization factor in the quantization matrix, or according to the image resolution and the image size; and determining, according to the compression strength, whether compression processing needs to be performed on the to-be-processed image, and in a case in which compression processing needs to be performed, determining a strength of the compression processing.

In a possible implementation manner, the frequency domain coefficient includes a direct current DC coefficient and an alternating current AC coefficient, and the determining, according to a frequency domain coefficient of each transform block of the to-be-processed image, whether image content corresponding to the transform block is flat image content includes:

determining whether a quadratic sum of all AC coefficients of the transform block is less than a product of a quadratic sum of DC coefficients of the transform block and a constant, where if yes, the image content corresponding to the transform block is flat image content; otherwise, the image content corresponding to the transform block is texture image content.

In this embodiment, amplitude decreasing processing is performed on a frequency domain coefficient of a to-be-processed image according to a texture direction of the to-be-processed image, which can improve the compression efficiency of the to-be-processed image without affecting subjective quality of the to-be-processed image.

Further, filtering processing is performed on flat image content of the to-be-processed image, to filter out noise of the flat image content, which can improve the compression efficiency and reduce occupied bandwidth without affecting subjective quality of the image, and moreover, the to-be-processed image does not lose texture details either.

In addition, for decoding a compressed to-be-processed image, previous decoding information of the image may be acquired in advance, so as to determine, according to a compression strength of the image, whether the image can be further compressed, which is more advantageous for controlling subjective quality of the compressed image.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present invention.

If the functions are implemented by computer software and are sold or used as independent products, it may be deemed, to some extent, that all or part (such as the part that contributes to the prior art) of the technical solutions of the present invention is embodied by a computer software product. The computer software product is generally stored in a computer readable non-volatile storage medium and includes several instructions for instructing a computer device (which may be a personal computer, a server, or a network device, and the like) to perform all or a part of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image compression method, comprising:
   determining a texture direction of a to-be-processed image; and
   performing amplitude decreasing processing on a frequency domain coefficient or a quantization coefficient of the to-be-processed image according to the texture direction, wherein the frequency domain coefficient is a coefficient obtained after the image is transformed, and the quantization coefficient is a coefficient obtained after the frequency domain coefficient is quantized,
   wherein performing amplitude decreasing processing on the frequency domain coefficient or the quantization coefficient of the to-be-processed image according to the texture direction comprises:
      acquiring an energy focused region and a non-energy focused region of the frequency domain coefficient or the quantization coefficient according to the texture direction, wherein a sum of frequency domain coefficient amplitudes or a sum of quantization coefficient amplitudes in the energy focused region is greater than that in the non-energy focused region, and
      performing amplitude decreasing processing on one or more frequency domain coefficients or quantization coefficients in the non-energy focused region.

2. An image compression method, comprising:
   determining a texture direction of a to-be-processed image;
   performing amplitude decreasing processing on a frequency domain coefficient or a quantization coefficient of the to-be-processed image according to the texture direction, wherein the frequency domain coefficient is a coefficient obtained after the image is transformed, and the quantization coefficient is a coefficient obtained after the frequency domain coefficient is quantized; and
   wherein before determining a texture direction of the to-be-processed image, the method further comprises:
      determining, according to a frequency domain coefficient of each transform block of the to-be-processed image, whether image content corresponding to the transform block is flat image content, wherein the transforms block is a block that is obtained by dividing the to-be-processed image in advance and on which frequency domain transform is performed, and
      performing amplitude decreasing processing on a frequency domain coefficient or a quantization coefficient of a transform block belonging to the flat image content.

3. The image compression method according to claim 2, wherein:
   determining a texture direction of the to-be-processed image comprises:
      determining a texture direction of a transform block belonging to texture image content, wherein the transform block belonging to the texture image content is a transform block that is in the to-be-processed image and does not belong to the flat image content; and
   performing amplitude decreasing processing on the frequency domain coefficient or the quantization coefficient of the to-be-processed image according to the texture direction comprises:
      performing, according to the texture direction, amplitude decreasing processing on a frequency domain coefficient or a quantization coefficient corresponding to the transform block belonging to the texture image content.

4. The image compression method according to claim 2, wherein:
   the frequency domain coefficient comprises a direct current (DC) coefficient and an alternating current (AC) coefficient; and
   determining, according to a frequency domain coefficient of each transform block of the to-be-processed image, whether image content corresponding to the transform block is flat image content comprises:
      determining whether a quadratic sum of all AC coefficients of the transform block is less than a product of a quadratic sum of DC coefficients of the transform block and a constant, wherein if yes, the image content corresponding to the transform block is flat image content, otherwise, the image content corresponding to the transform block is texture image content.

5. An image compression method, comprising:
   determining a texture direction of a to-be-processed image;
   performing amplitude decreasing processing on a frequency domain coefficient or a quantization coefficient of the to-be-processed image according to the texture direction, wherein the frequency domain coefficient is a coefficient obtained after the image is transformed, and the quantization coefficient is a coefficient obtained after the frequency domain coefficient is quantized; and
   wherein before determining a texture direction of the to-be-processed image, the method further comprises:
      decoding the to-be-processed image, to obtain decoding information of the to-be-processed image, wherein the decoding information comprises at least one of the frequency domain coefficient, a quantization matrix, image resolution, and an image size of the to-be-processed image, determining a compression strength of the to-be-processed image according to the frequency domain coefficient of the to-be-processed image, or according to a quantization factor in the quantization matrix, or according to the image resolution and the image size, and determining, according to the compression strength, whether compression processing needs to be performed on the to-be-processed image, and in a case in which compression processing needs to be performed, determining a strength of the compression processing.

6. An image compression method, comprising:

determining a texture direction of a to-be-processed image;

performing amplitude decreasing processing on a frequency domain coefficient or a quantization coefficient of the to-be-processed image according to the texture direction, wherein the frequency domain coefficient is a coefficient obtained after the image is transformed, and the quantization coefficient is a coefficient obtained after the frequency domain coefficient is quantized, wherein the frequency domain coefficient comprises a direct current (DC) coefficient and an alternating current (AC) coefficient; and wherein determining a texture direction of the to-be-processed image comprises:

determining, according to a frequency domain AC coefficient of a transform block in the image, a texture direction of a to-be-processed image corresponding to the transform block.

7. An image compression method, comprising:

determining, according to a frequency domain coefficient of each transform block of a to-be-processed image, whether image content corresponding to the transform block is flat image content, and wherein the transform block is a block that is obtained by dividing the to-be-processed image in advance and on which frequency domain transform is performed;

performing amplitude decreasing processing on a frequency domain coefficient or a quantization coefficient of a transform block belonging to the flat image content; and wherein before determining, according to a frequency domain coefficient of each transform block of the to-be-processed image, whether image content corresponding to the transform block is flat image content, the method further comprises:

decoding the to-be-processed image, to obtain decoding information of the to-be-processed image, wherein the decoding information comprises at least one of the frequency domain coefficient, a quantization matrix, image resolution, and an image size of the to-be-processed image, determining a compression strength of the to-be-processed image according to the frequency domain coefficient of the to-be-processed image, or according to a quantization factor in the quantization matrix, or according to the image resolution and the image size, and determining, according to the compression strength, whether compression processing needs to be performed on the to-be-processed image, and in a case in which compression processing needs to be performed, determining a strength of the compression processing.

8. An image compression method, comprising:

determining, according to a frequency domain coefficient of each transform block of a to-be-processed image, whether image content corresponding to the transform block is flat image content, and wherein the transform block is a block that is obtained by dividing the to-be-processed image in advance and on which frequency domain transform is performed;

performing amplitude decreasing processing on a frequency domain coefficient or a quantization coefficient of a transform block belonging to the flat image content, wherein the frequency domain coefficient comprises a direct current (DC) coefficient and an alternating current (AC) coefficient; and wherein determining, according to a frequency domain coefficient of each transform block of the to-be-processed image, whether image content corresponding to the transform block is flat image content comprises:

determining whether a quadratic sum of all AC coefficients of the transform block is less than a product of a quadratic sum of DC coefficients of the transform block and a constant, wherein if yes, the image content corresponding to the transform block is flat image content, otherwise, the image content corresponding to the transform block is texture image content.

9. An image compression apparatus, comprising:

a processor; and memory coupled to the processor, the memory comprising instructions that, when executed by the processor, cause the apparatus to:

determine a texture direction of a to-be-processed image, perform amplitude decreasing processing on a frequency domain coefficient or a quantization coefficient of the to-be-processed image according to the texture direction, wherein the frequency domain coefficient is a coefficient obtained after the image is transformed, and the quantization coefficient is a coefficient obtained after the frequency domain coefficient is quantized, acquire an energy focused region and a non-energy focused region of the frequency domain coefficient or the quantization coefficient according to the texture direction, wherein a sum of frequency domain coefficient amplitudes or a sum of quantization coefficient amplitudes in the energy focused region is greater than that in the non-energy focused region, and perform amplitude decreasing processing on one or more frequency domain coefficients or quantization coefficients in the non-energy focused region.

10. An image compression apparatus, comprising:

a processor; and memory coupled to the processor, the memory comprising instructions that, when executed by the processor, cause the apparatus to:

determine a texture direction of a to-be-processed image, perform amplitude decreasing processing on a frequency domain coefficient or a quantization coefficient of the to-be-processed image according to the texture direction, wherein the frequency domain coefficient is a coefficient obtained after the image is transformed, and the quantization coefficient is a coefficient obtained after the frequency domain coefficient is quantized, and determine, according to a frequency domain coefficient of each transform block of the to-be-processed image, whether image content corresponding to the transform block is flat image content, wherein the transform block is a block that is obtained by dividing the to-be-processed image in advance and on which frequency domain transform is performed, and perform amplitude decreasing processing on a frequency domain coefficient or a quantization coefficient of a transform block belonging to the flat image content.

11. The image compression apparatus according to claim 10, wherein the memory further comprises instructions that, when executed by the processor, cause the apparatus to:

determine a texture direction of a transform block belonging to texture image content, wherein the transform block belonging to the texture image content is a transform block that is in the to-be-processed image and does not belong to the flat image content; and perform, according to the texture direction, amplitude decreasing processing on a frequency domain coefficient or a quantization coefficient corresponding to the transform block belonging to the texture image content.

12. The image compression apparatus according to claim 10, wherein:

the frequency domain coefficient comprises a direct current (DC) coefficient and an alternating current (AC) coefficient; and the memory further comprises instructions that, when executed by the processor, cause the apparatus to:

determine whether a quadratic sum of all AC coefficients of the transform block is less than a product of a quadratic sum of DC coefficients of the transform block and a constant, wherein if yes, the image content corresponding to the transform block is flat image content, otherwise, the image content corresponding to the transform block is texture image content.

13. An image compression apparatus, comprising:
a processor; and
memory coupled to the processor, the memory comprising instructions that, when executed by the processor, cause the apparatus to:

determine a texture direction of a to-be-processed image, perform amplitude decreasing processing on a frequency domain coefficient or a quantization coefficient of the to-be-processed image according to the texture direction, wherein the frequency domain coefficient is a coefficient obtained after the image is transformed, and the quantization coefficient is a coefficient obtained after the frequency domain coefficient is quantized, decode the to-be-processed image, to obtain decoding information of the to-be-processed image, wherein the decoding information comprises at least one of the frequency domain coefficient, a quantization matrix, image resolution, and an image size of the to-be-processed image, determine a compression strength of the to-be-processed image according to the frequency domain coefficient of the to-be-processed image, or according to a quantization factor in the quantization matrix, or according to the image resolution and the image size, and determine, according to the compression strength, whether compression processing needs to be performed on the to-be-processed image, and in a case in which compression processing needs to be performed, determine a strength of the compression processing.

14. An image compression apparatus, comprising:
a processor; and
memory coupled to the processor, the memory comprising instructions that, when executed by the processor, cause the apparatus to:

determine a texture direction of a to-be-processed image, perform amplitude decreasing processing on a frequency domain coefficient or a quantization coefficient of the to-be-processed image according to the texture direction, wherein the frequency domain coefficient is a coefficient obtained after the image is transformed, the quantization coefficient is a coefficient obtained after the frequency domain coefficient is quantized, and the frequency domain coefficient comprises a direct current (DC) coefficient and an alternating current (AC) coefficient, and determine, according to a frequency domain AC coefficient of a transform block in the image, a texture direction of a to-be-processed image corresponding to the transform block.

15. An image compression apparatus, comprising:
a processor; and
memory coupled to the processor, the memory comprising instructions that, when executed by the processor, cause the apparatus to:

determine, according to a frequency domain coefficient of each transform block of a to-be-processed image, whether image content corresponding to the transform block is flat image content, wherein the transform block is a block that is obtained by dividing the to-be-processed image in advance and on which frequency domain transform is performed; and perform amplitude decreasing processing on a frequency domain coefficient or a quantization coefficient of a transform block belonging to the flat image content.

16. The image compression apparatus according to claim 15, wherein the memory further comprises instructions that, when executed by the processor, cause the apparatus to:

decode the to-be-processed image, to obtain decoding information of the to-be-processed image, wherein the decoding information comprises at least one of the frequency domain coefficient, a quantization matrix, image resolution, and an image size of the to-be-processed image, determine a compression strength of the to-be-processed image according to the frequency domain coefficient of the to-be-processed image, or according to a quantization factor in the quantization matrix, or according to the image resolution and the image size, and determine, according to the compression strength, whether compression processing needs to be performed on the to-be-processed image, and in a case in which compression processing needs to be performed, determine a strength of the compression processing.

17. The image compression apparatus according to claim 15, wherein the memory further comprises instructions that, when executed by the processor, cause the apparatus to:
 determine whether a quadratic sum of all AC coefficients of the transform block is less than a product of a quadratic sum of DC coefficients of the transform block and a constant, wherein if yes, the image content corresponding to the transform block is flat image content, otherwise, the image content corresponding to the transform block is texture image content.

* * * * *